Patented Sept. 4, 1945

2,384,015

UNITED STATES PATENT OFFICE 2,384,015

THERMOSETTING PLASTIC MATERIAL

Le Grand Daly, Port Clinton, Ohio

No Drawing. Application June 4, 1941,
Serial No. 396,504

4 Claims. (Cl. 260—9)

The invention relates to improved synthetic plastic material of the thermosetting type and to a method of producing it, and it is particularly directed to material of this nature having improved physical properties including higher tensile strength, increased hardness and flexural resiliency, and greater impact resistance, than heretofore secured in thermosetting synthetic plastics.

It is generally known that at the present time there exists an acute shortage in a number of "strategic" metals and alloys including the so-called light metals aluminum, magnesium, and their alloys. Although it is expected that this shortage will be eventually corrected by increased production, a widespread search has been in progress for substitute materials to supply the needed parts for military equipment for national defense.

The material herein disclosed is not only completely successful as a substitute for the metals and alloys previously used in certain military applications such as detonator fuses and bomb fins, but there is, in addition, a material reduction in weight, the specific gravity of the present plastic material being approximately only three-fourths as great as that of the ordinary magnesium-base alloys and one-half as great as the ordinary aluminum-base alloys. Since the properties of this plastic material are entirely adequate for its intended purpose, no reason is seen why its substitution for the previous metal parts should not be a permanent one. Obviously a material of this nature is also useful in general applications and it has been found to be advantageously applicable in the automotive industry, for instance for certain motor accessories, and for hydraulic brake cups.

One object of the invention, therefore, is the provision of a synthetic plastic material of the thermosetting type having superior flexural properties, yet exhibiting adequate tensile strength and hardness. The thermosetting plastics are preferred for my specific purpose since their physical properties remain stable to a considerably higher temperature than, for example, the thermoplastic types.

As a basic constituent of the composition of matter now to be disclosed I use a synthetic resin of the phenol furfuraldehyde type, popularly known as phenol furfural. As will appear hereinbelow I prefer to use a special grade of resin available commercially under the trade name and identification characteristics Durite 221X. This resin I prefer to use in the "A" phase, or alpha phase, for several reasons. The alpha phase represents a preliminary condition of the material, which later, under the influence of aging or under applied heat, progresses through an intermediate or "B" phase (beta phase), and eventually to a relatively stable or "C" phase. The material if and when used in the molding art, has been generally compounded in the beta phase, from which it is thermoset, or "cured," to the "C" phase.

I have discovered, however, that when used in combination with ligneous material, or cellulosic fibers such as cotton floc, generally in the form of chopped up lengths of string or fiber, the alpha phase phenol furfural displays a considerably accentuated tendency to thoroughly embrace and impregnate the organic fibrous material, and to more closely approach a homogeneous, closely knit texture, than when the phenol furfural is used in the beta phase in accordance with commonly accepted practice. I have further found that when I use a mix wherein the alpha phase phenol furfural is included, the compound can be formed, by pressure molding, into more intricate shapes, of smaller section thickness, than by the use of beta phase phenol furfural. As a result of the more intimate admixture of the alpha phase resin with the fibrous material, and the more tenacious mutual adherence therebetween, the final product is characterized by the improved physical properties indicated hereinabove. In addition, the material, and articles made therefrom, withstand a wide range of temperature without material deterioration in physical properties.

The phenol furfuraldehyde resin discussed herein is available commercially. I have found that it may be procured, in the alpha phase, from the Durite Plastics Company under the trade name "Durite 221X." As is known to those skilled in the art, a plasticizer is generally used in compounding resin-containing substances. A preferred plasticizer is also obtainable commercially from the Durite Plastics Company under the trade designation "1930 plasticizer." This "1930 plasticizer" is a phenol alcohol, and more specifically an incipient reaction product in stoichiometric proportions of phenol and formaldehyde. To form what might be termed a base mixture, I add to the alpha phase phenol furfuraldehyde and the plasticizer a small amount of calcium stearate, the relative proportions of the three ingredients being about as follows:

| | Parts |
|---|---|
| Phenol furfuraldehyde (alpha phase) | 100 |
| Plasticizer | 5 |
| Calcium stearate | 1 |

As above indicated this compound may be further modified by adding various proportions of filler materials, which are generally intended to modify to some extent the pre-existing physical properties of the compound. Considerable impact resistance may be developed, for instance, by the addition of lignin, cotton floc, and/or cotton fabric waste, the several materials being chopped up so as to be amenable to the ordinary mixing processes, and being conveniently mixed by being agitated in a tumbling machine. A small proportion of coloring material may be found desirable, the proportions by weight of the various filler ingredients being about as follows:

| | Parts |
|---|---|
| Lignin fiber | 15 |
| Cotton floc | 15 |
| Cotton fabric waste | 30 |
| Coloring material | 2 |

The proportions of the filler materials relative to each other, and the proportion of the total volume of filler to the basic phenol furfural mix disclosed above may be varied to suit specific applications. The actual composition above noted is one which has been found suitable for detonator fuses and tail fins for bombs or projectiles. It might be noted that lignin has generally been regarded as a waste product in certain paper manufacturing processes.

For certain applications where an exceptionally high flexural strength is required, I add to the filling material from about 10 parts to about 30 parts by weight of natural or synthetic rubber. By "synthetic rubber" I mean synthetic material possessing the approximate physical properties of natural rubber, as the term is generally used and recognized by the art. As so used and recognized, the term includes the variety of chloroprene polymer generally available under the trade name "neoprene." Natural cured rubber may be used when the article is not subjected to solvent attack by hydrocarbon oils, whereas such attack is counteracted by using synthetic rubber. In either case, the rubber or synthetic rubber is ground to pass a 30 mesh sieve, and is mixed with the other ingredients of the original mix. In this way I have secured a very material decrease in brittleness, and an increase in toughness and impact resistance without sacrifice of ultimate strength. When using butadiene types of synthetic rubber instead of the chloroprene type, I maintain the proportions of the various ingredients substantially as heretofore described but I prefer to also add smoked rubber sheet, ground as aforesaid, in amount between 10 per cent and 20 per cent of the butadiene content, to serve principally as a plasticizer.

When the material has been compounded in proportions such as disclosed above and has thereafter been thoroughly mixed, it is available for any of the familiar pressure molding operations suited to the manufacture of molded articles from plastic materials. Compositions of matter within the scope of the present disclosure may be formed, for instance, by compression molding, transfer molding, or injection molding. I have produced detonator fuse housings by transfer molding and projectile "wind-breaker points" by compression molding. The particular characteristics of a thermosetting material must of course be borne in mind in pre-arranging the technical details.

The compound, including a major proportion of "A" phase phenol furfural as aforesaid, may be preheated within certain temperature limits but not enough to produce any material "curing" effect, and if such preheating is used it should not in any event exceed 250° F. The compound is preferably used without such preliminary treatment, and a suitable proportion is introduced into the mold cavity, or into a charging chamber from which the proper amount is transferred or injected into a molding cavity and, as a result of the mold being maintained at a predetermined temperature, the compound is heated to between 300° and 360° F. until curing is substantially complete. A pressure of from 2000 to 6000 pounds per square inch of casting surface is maintained by conventional pressure molding apparatus for a period of several minutes upwards, say from 1 to 15 minutes, the time required being increased in substantially direct ratio to the section thickness. I have found two minutes adequate for sections of ⅛" thickness and ten minutes for ½". The time at heat under pressure may be somewhat decreased if the temperature is increased. If, as is generally the case, the article being molded contains sections of various thicknesses, the time schedule should be arranged to permit sufficient curing of the heaviest section. The curing time required is preferably somewhat lengthened over that generally specified when using beta phase resin of this type, but so many factors determine the actual time in each new application that such indications as I have given hereinabove, in conjunction with the skill and experience of the molding technician, will be amply sufficient to permit those skilled in the art to practice the invention.

What I claim is:

1. A thermosetting composition of matter for molded articles comprising a synthetic resin base including a major proportion of an alpha phase phenol furfuraldehyde, a minor proportion of calcium stearate, and further comprising a filler material including substantial proportions of lignin, cotton floc, and cotton fabric waste, and a substantal proportion of polychloroprene.

2. A thermosetting composition of matter for molded articles comprising a synthetic resin base including 100 parts of phenol furfuraldehyde in the alpha phase, 1 part of calcium stearate and a filler material including 15 parts of lignin, 15 parts of cotton floc, 30 parts of cotton fabric waste and 2 parts of coloring material.

3. A thermosetting composition of matter for molded articles comprising a synthetic resin base including 100 parts of phenol furfuraldehyde in the alpha phase, 1 part of calcium stearate, and a filler material including 15 parts of lignin, 15 parts of cotton floc, 30 parts of cotton fabric waste, 2 parts of coloring material, and 10 to 30 parts of polychloroprene.

4. A thermosetting composition of matter for molded articles comprising a synthetic resin base including a major proportion of phenol furfuraldehyde in the alpha phase, a minor proportion of calcium stearate, and a filler material including substantial proportions of lignin, cotton floc, and cotton fabric waste.

LE GRAND DALY.